Oct. 23, 1934.   N. F. ANDREWS   1,977,790
CORN HARVESTER
Filed Sept. 30, 1931   3 Sheets-Sheet 3
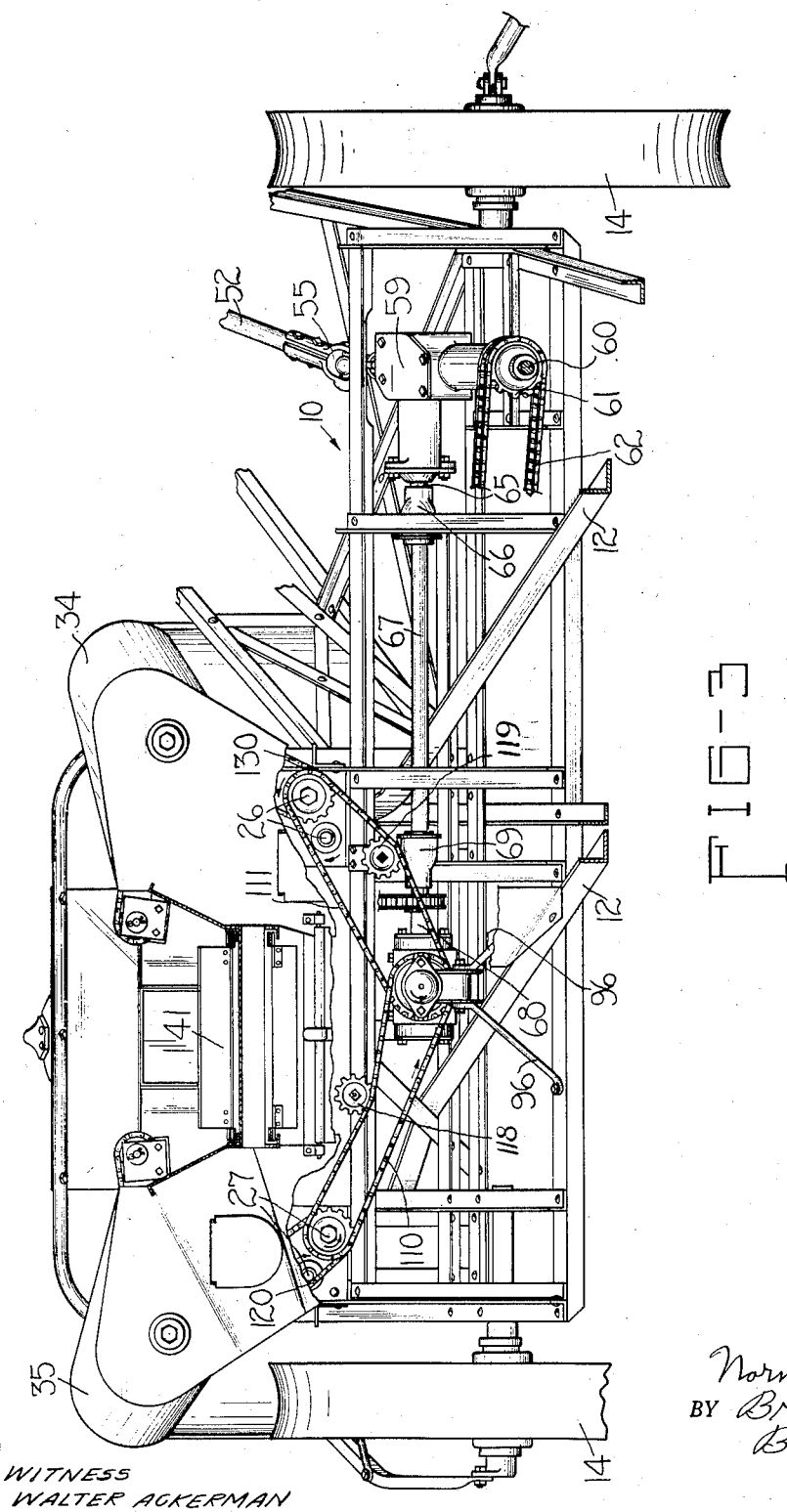
INVENTOR.
Norman F. Andrews
BY Brown, Jackson
Boettcher & Dienner
ATTORNEY.
WITNESS
WALTER ACKERMAN Patented Oct. 23, 1934

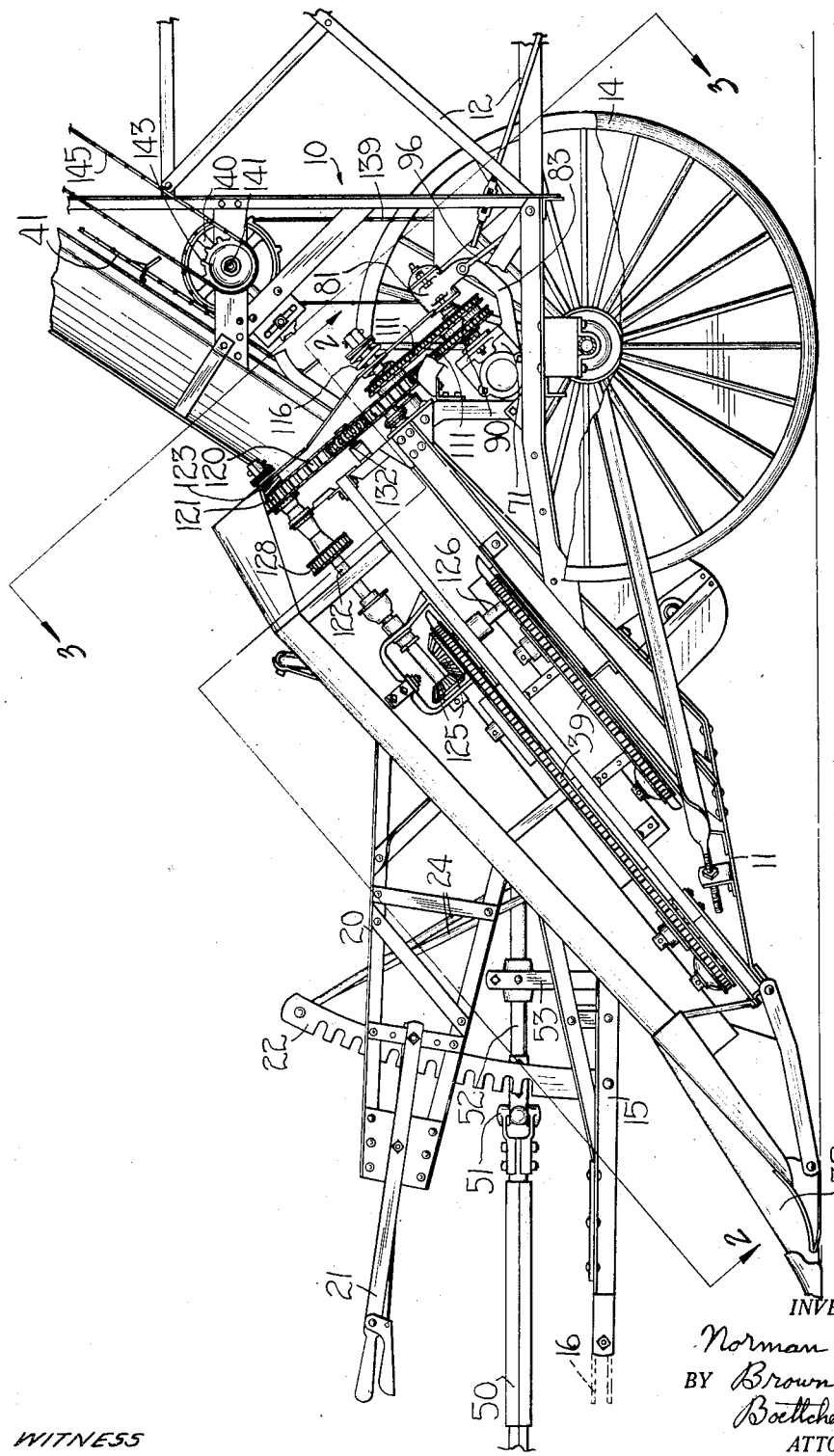

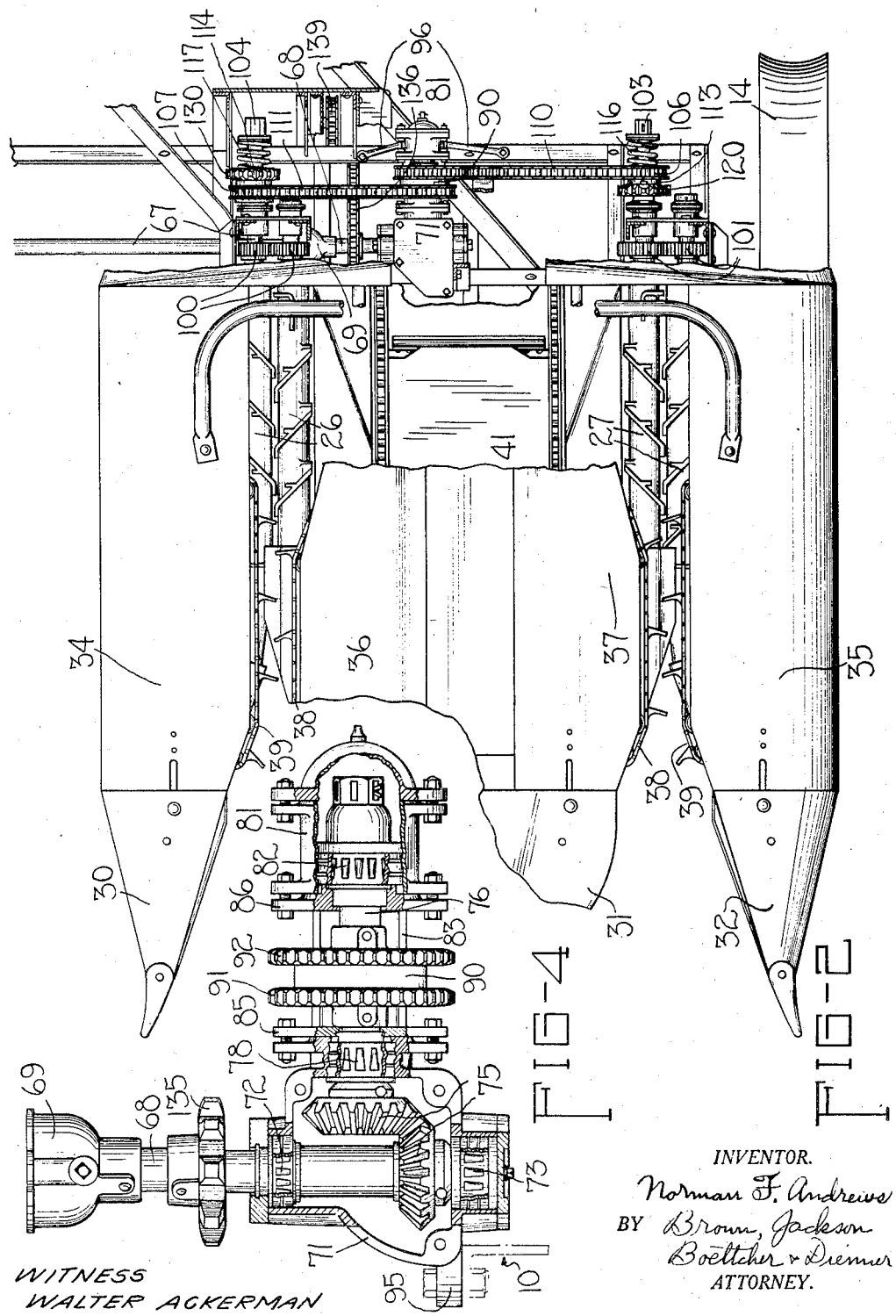

1,977,790

UNITED STATES PATENT OFFICE 1,977,790

CORN HARVESTER

Norman F. Andrews, East Moline, Ill., assignor to Deere & Company, Moline, Ill., a corporation of Illinois Application September 30, 1931, Serial No. 565,979

17 Claims. (Cl. 56—18)

The present invention relates generally to corn harvesters of the type including snapping and husking rolls and adapted to be driven from the motor of the tractor which propels the harvester. More specifically, it is the principal purpose of the present invention to provide a novel form of power drive between the power shaft leading from the tractor and the two sets of snapping rolls of a two-row corn harvester. The present power drive contemplates a simplified structure in which a common drive member is connected to one roll of each set to operate the same. Provision is also made for actuating certain of the elevator means from the power drive.

It is also the purpose of the present invention to provide an improved corn harvester of the two-row type in which the inner roll of each set of snapping rolls is positioned somewhat lower than the companion roll to facilitate the deposit of ears into a common elevator means operating between the sets of rolls.

These and other objects of the present invention will be apparent to those skilled in the art after a consideration of the following detailed description of the preferred structural embodiment, taken in conjunction with the accompanying drawings, in which:—

Figure 1 is a vertical side view of a corn harvester embodying the principles of the present invention and in which certain parts have been broken away in order to better show my improved power drive and associated parts;

Figure 2 is a fragmentary top plan view, certain parts being shown broken away, corresponding to a view along the line 2—2 of Figure 1;

Figure 3 is a rear view looking forwardly substantially along the line 3—3 of Figure 1; and Figure 4 is an enlarged detail of the common driving member for the two sets of snapping rolls.

Referring now to the drawings, the reference numeral 10 indicates in its entirety the supporting frame of the corn harvester which includes forwardly extending frame members 11 supporting, in general, the picking mechanism, and rearwardly extending frame members 12 supporting, in general, the husking mechanism of the harvester. The details of the supporting frame work, as such, form no part of the present invention, the frame being substantially the same as that shown in the Patent No. 1,908,118, issued May 9, 1933, to Nolan D. Colvin, for a Corn harvester, to which reference may be had for specific structure not illustrated here. It suffices to note for the purposes of this description that the forward portion 11 of the frame substantially balances the rearward portion 12 about the axis of the supporting wheels 14. The frame also includes a forwardly extending draft member 15 adapted to be pivotally connected with a draw bar 16 of a tractor, the draft member 15 being pivotally connected with the other portion of the frame, the latter portion being vertically adjusted by virtue of a forward truss member 20 carried by the frame and including a hand lever 21 cooperating with a rack 22 carried by the draft member 15 and suitably braced, as by bracings 24.

The picking mechanism of the corn harvester includes two pairs of snapping rolls 26 and 27 suitably journaled in the frame 10 and operating in conjunction with gatherers 30, 31 and 32. The snapping rolls 26 and 27 project downwardly and forwardly and are positioned between adjacent gatherers, as best shown in Figures 1 and 2. Outside shields 34 and 35 protect the snapping mechanism in conjunction with inside shields 36 and 37. The shields 34 and 36, and 35 and 37, are separated adjacent the snapping rolls to permit the stalks of corn to pass therebetween, and suitable gatherer chains 38 and 39 are mounted under the shields and over the snapping rolls to positively convey the stalks of corn therebetween. In order to convey the ears of corn rearwardly, a common elevator means 41 is operatively mounted between the two sets of snapping rolls 26 and 27, this elevator means operating upwardly and rearwardly and serving to convey the ears of corn to the husking mechanism (not shown).

In order to facilitate the deposit of ears of corn onto the elevator 41 operating between the snapping rolls 26 and 27, the inner rolls are positioned somewhat lower than the companion rolls, so that the tendency for the ears of corn is to be projected towards the elevator 41.

For the purpose of driving the snapping rolls and the other operating mechanisms of the corn harvester, the present invention contemplates a novel form of power drive which will now be described. The reference numeral 50 indicates the telescopic power drive or power take-off shaft connected through a universal joint 51 with a power shaft 52 journaled in standards 53 carried by the draft member 15. The rear end of the power shaft 52 is connected through a universal joint 55 with a short shaft journaled in a housing 59 near the righthand side of the machine and securely fastened to the frame 10. The housing 59 also includes a shaft 60 having at its outer end a sprocket 61 over which is trained a drive chain 62 which operates the husking rolls and the wagon elevator, all forming a part of the corn harvester.

The housing 59 encloses suitable bevel gearing which drives, not only the shaft 60, but also an additional shaft 65 extending transversely of the machine and having at its inner end a universal joint 66 with which is connected a second transverse drive shaft 67 extending to a point near the central portion of the machine where it connects with a third transverse shaft 68 through a universal joint 69.

The drive shaft 68 is journaled in a housing section 71, the latter being provided with anti-friction means 72 and 73 for that purpose, and is connected through a pair of bevel gears 75 with a driving member in the form of a short shaft 76. The driving member 76 has one end journaled in the housing section 71, as by anti-friction bearings 78, the other end of the shaft 76 being journaled in a housing section 81, the latter being provided with anti-friction bearings 82 for that purpose.

The two housing sections 71 and 81 are preferably integrally formed and are connected through a connecting bracket 83, (see Figures 1 and 4). The adjacent ends of the housing sections 71 and 81 are provided with lubricant retaining plates 85 and 86 to retain lubricant in the housing sections.

The shaft 76 carries a sprocket member 90 in the form of a double sprocket having two sprocket wheels 91 and 92 rigidly secured to the shaft 76 and forming power driven means for driving the snapping rolls. The housing structure comprising the housing sections 71 and 81 and the intermediate connecting bracket 83 is rigidly secured to the frame 10 by means of a lug 95 bolted to one of the bars constituting the frame 10 and suitable braces 96 secured to the housing section 81 and an adjacent frame bar.

Referring now to the snapping rolls and the driving connections between the double sprocket member 90 and the snapping rolls, it is the usual practice to rotate the two rolls of each set in opposite directions so that the adjacent surfaces of the two companion rolls move downwardly for the purpose of forcing the stalks downwardly as they are led in between the rolls as the machine advances forwardly. In order, therefore, to drive both sets of snapping rolls from a single driving member, namely, the shaft 96 and the double sprocket thereon, it is necessary to connect the rolls of each set or pair together through suitable spur gearing, for example, so that only one roll of each set or pair need be driven. It is also necessary to choose for the driving roll of each pair that roll which normally rotates in the same direction as the direction of rotation of the driving member, namely, the double sprocket 90. As will be apparent from Figure 3, to secure this result the present invention contemplates connecting the inner roll of one pair and the outer roll of the other pair with the driving member.

The two spur gears which interconnect the snapping rolls 26 are indicated by the reference numeral 100 and the two spur gears which interconnect the snapping rolls 27 are indicated by the reference numeral 101, these spur gears being secured to the roll shafts in any desired manner. The inner roll of the pair of rolls 27 and the outer roll of the pair of rolls 26 each includes rearwardly extended shaft portion 103 and 104, respectively, the extension 103 being provided with a sprocket 106 and the extension 104 being provided with a sprocket 107. A driving chain 110 serves to connect the sprockets 92 and 106 and a second driving chain 111 serves to connect the sprockets 91 and 107. A sprocket 113 is directly associated with the sprocket 106 on the extension 103 and a sprocket 114 is directly associated with the sprocket 107 on the extension 104. Preferably, the sprockets on the roll shaft extensions are connected therewith through a conventional form of slip clutch, as indicated at 116 and 117. An idler 118 is journaled on the main frame of the harvester and cooperates with the driving chain 110 to maintain the same tight and for taking up any slack that might develop in the chain and an idler 119 is associated with the driving chain 111 for the same purpose.

The additional sprockets 113 and 114 on the driving rolls are connected with the gatherer chains associated with the snapping rolls. The two sets of gatherer chains associated with the rolls 27 on the left hand side of the machine are driven by means best shown in Figure 1. A driving chain 120 is trained over the sprocket 113 on the roll extension 103 and serves to drive a sprocket 121 connected with a shaft 122 through a slip clutch connection 123. The shaft 122 extends underneath the shield 35 and is journaled on the frame of the harvester in a position approximately parallel to the axes of the snapping rolls 27. The lower and forwardmost end of the shaft 122 is connected through a set of bevel gears 125 with a short shaft 126 carrying suitable sprockets which drive the upper and lower gatherer chains 39. The gatherer chains 38 on the other side of the rolls 27 are driven from the shaft 122 by a similar mechanism which includes a transverse driving chain 128 trained over a sprocket secured to the shaft 122. Substantially the same means is driven from the sprocket 114 on the roll extension 104 for driving the gatherer chains 38 and 39 on the righthand of the machine, driving chain 130 trained over the sprocket 114 serving to drive the gatherer chain shaft on the righthand side of the machine. Suitable idlers 132 are associated with the chains 120 and 130 to take up the slack therein.

The elevator 41 is driven from the transverse drive shaft 67 through suitable mechanism which includes a sprocket 135 on the shaft section 68 and a chain 136 trained around the sprocket, the chain 136 serving to drive, through suitable idler sprockets, the chain 139 trained over a sprocket 140 fixed to one end of a shaft 141 journaled in brackets on the frame 10 and having at its other end a sprocket 143 driving a chain 145 extending to the upper end of the elevator 41 to drive the latter.

While I have shown and described the preferred structural embodiment, it is to be understood that my invention is not to be limited to the specific means shown and described, but that, in fact, widely different means can be employed in the practice of the broader aspects of my invention as defined in the appended claims.

What I claim, therefore, and desire to secure by Letters Patent is:—

1. In a corn picker, two spaced apart snapping rolls, and means for driving said snapping rolls comprising a transverse drive shaft, a double sprocket driven thereby, and a pair of sprocket chains trained over said double sprocket and connected with said snapping rolls, respectively.

2. In a corn picker, two pairs of snapping rolls, means connecting the rolls of each pair to rotate together, and driving means for driving both pairs of snapping rolls, said driving means comprising a transverse drive shaft, sprocket means driven from said drive shaft and means including a chain for driving one roll of each pair from said sprocket means.

3. An agricultural machine comprising a tractor propelled corn harvester having two pairs of snapping rolls, a transverse drive shaft, means connecting said shaft with the power take-off of the tractor, a longitudinally extending shaft, bevel gears driving the last named shaft from the drive shaft, sprocket means carried by said longitudinal shaft, and sprocket chain means connected with said sprocket for driving both of said pairs of snapping rolls.

4. A tractor driven implement comprising, in combination, a frame, two pairs of snapping rolls journaled for rotation on the frame, a transverse drive shaft journaled on said frame and driven from the power of the tractor, a gear housing secured to said frame and receiving one end of said drive shaft, a longitudinal shaft supported by said housing, bevel gearing connecting said shafts, a double sprocket carried by the longitudinal shaft, and a separate driving chain leading from the double sprocket to each of said pairs of snapping rolls to drive the latter.

5. A tractor driven corn picker comprising, in combination, a frame, a pair of snapping rolls journaled on the frame for rotation in opposite directions, spur gear means connecting said rolls, one of said rolls including a rearwardly extending shaft portion having a sprocket and a slip clutch connection thereon, a transverse drive shaft journaled on the frame, a gear housing receiving one end of the shaft and having extension means providing bearings, a longitudinal shaft supported in said bearings and connected through a set of bevel gears with said drive shaft, a sprocket carried by the longitudinal shaft, and a drive chain trained over said last named sprocket and the sprocket on the shaft extension of said one snapping roll.

6. A corn harvester comprising, in combination, a wheeled frame, a pair of snapping rolls journaled on said frame, spur gearing connecting said rolls to rotate simultaneously, one of said rolls including a rearwardly extending shaft extension, a transverse drive shaft journaled on said frame, a double sprocket driven by said drive shaft, a sprocket mounted on said shaft extension, a slip clutch connecting the sprocket to the extension, a driving sprocket chain trained over said sprocket and said double sprocket, and other operating mechanism driven from said double sprocket.

7. In a corn harvester including two pairs of snapping rolls, each pair comprising inner and outer rolls geared together and rotatable in opposite directions, means for driving said rolls comprising a pair of connected sprocket wheels rotatable together in one direction, a sprocket on the inner roll of one pair, a second sprocket on the outer roll of the other pair, a driving sprocket chain trained over one of said sprockets and one of said sprocket wheels, and a second driving sprocket chain trained over the other sprocket and sprocket wheel.

8. A corn harvester comprising, in combination, a wheeled frame, forwardly and downwardly extending snapping rolls journaled on said frame, a transverse drive shaft journaled on said frame, a substantially horizontal power shaft journaled on the harvester frame, bevel gearing connecting the power shaft with said drive shaft near one end of the latter, a third shaft journaled in said frame and extending substantially parallel with respect to said snapping rolls, bevel gearing connecting said third shaft with said drive shaft at the other end thereof, and sprocket and sprocket chain means driving said snapping rolls from said third shaft.

9. A corn harvester comprising, in combination, a wheeled frame, a pair of snapping rolls journaled on said frame, gearing arranged to drive one of said rolls from the other, a pair of sprockets mounted on said other snapping roll, means establishing a driving connection between said sprockets and said other snapping roll, a power driven shaft journaled on said frame and including a sprocket thereon, a driving chain trained over said last named sprocket and one of the sprockets on said other snapping roll, gatherer chains associated with said snapping rolls, and means driving the gatherer chains including a sprocket chain trained over the other sprocket on said other snapping roll.

10. In an agricultural machine including operating mechanism, a power drive for said mechanism including a transverse drive shaft, a housing receiving one end of said drive shaft, a second shaft extending at right angles to said drive shaft and having one end journaled in said housing, bevel gears connecting said shafts in driving relation and mounted in said housing, a second housing in which the other end of the second shaft is journaled, means rigidly connecting said two housings, and driving sprockets carried by said second shaft between said housings.

11. In an agricultural machine including operating mechanism, a power drive for said mechanism including a power driven shaft, a second shaft extending at right angles to said first shaft, and a housing structure for said second shaft and the adjacent end of the first shaft, said housing structure comprising a pair of housing sections, integral bracket means connecting said sections, one of the sections being provided with anti-friction means for the adjacent ends of said shafts, connecting gearing enclosed by said housing section, and anti-friction means for the other end of said second shaft carried by the other housing section.

12. A corn harvester comprising, in combination, a supporting frame, two pairs of snapping rolls journaled on said frame, a power shaft extending longitudinally of said frame, a transverse drive shaft driven from said power shaft, driving connections between said transverse drive shaft and one roll of each pair of snapping rolls, said connections comprising a driving member geared to said transverse drive shaft and driving chains driven from said member and connected with one roll of each pair of rolls, gatherer chains associated with each pair of snapping rolls, a drive shaft for said gatherer chains, and sprocket and chain means connecting the gatherer drive shaft for each pair of snapping rolls with the driving roll of that pair.

13. A corn harvester comprising, in combination, a supporting frame, two spaced apart pairs of snapping rolls, means connecting the rolls of each pair to rotate simultaneously and in opposite directions, common driving means for certain of said rolls which rotate in the same direction, the inner rolls being mounted lower than the outer rolls, and common elevator means operating between said inner rolls and arranged to receive ears of corn from both of said pairs of snapping rolls.

14. In a corn picker, two spaced apart sets of snapping rolls, and means for driving said snapping rolls comprising a transverse drive shaft, a double sprocket driven thereby and disposed between said sets, and a pair of sprocket chains trained over said double sprocket and connected with said snapping rolls, respectively.

15. In a corn picker, two spaced apart snapping rolls, means for driving said snapping rolls comprising a double sprocket disposed in a plane perpendicular to the axes of said rolls, and a pair of sprocket chains trained over said double sprocket and connected with said snapping rolls, respectively.

16. In a corn harvester including two pairs of snapping rolls, each pair comprising inner and outer rolls geared together, means for driving said rolls comprising a pair of connected sprocket wheels rotatable together in one direction, a sprocket on one roll of each pair, a driving sprocket chain trained over one of said sprockets and one of said sprocket wheels, and a second driving sprocket chain trained over the other sprocket and sprocket wheel.

17. A corn harvester comprising, in combination, a wheeled frame, a pair of snapping rolls journaled on said frame, gearing arranged to drive one of said rolls from the other, a sprocket mounted on said other snapping roll, means establishing a driving connection between said sprocket and said other snapping roll, a power driven shaft journaled on said frame and including a sprocket thereon, a driving chain trained over said last mentioned sprocket and the sprocket on said other snapping roll, gatherer chains associated with said snapping rolls, and means driving the gatherer chains including a third sprocket mounted on one of said rolls and a sprocket chain trained over said third sprocket.

NORMAN F. ANDREWS.